United States Patent

Seo et al.

(10) Patent No.: US 9,857,251 B2
(45) Date of Patent: Jan. 2, 2018

(54) LOAD DETECTION APPARATUS

(71) Applicant: Aisin Seiki Kabushiki Kaisha, Kariya-shi (JP)

(72) Inventors: Kazumasa Seo, Nagakute (JP); Hisayoshi Okuya, Novi, MI (US)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 0 days.

(21) Appl. No.: 15/136,022

(22) Filed: Apr. 22, 2016

(65) Prior Publication Data

US 2016/0313196 A1    Oct. 27, 2016

(30) Foreign Application Priority Data

Apr. 24, 2015 (JP) .................................. 2015-089596

(51) Int. Cl.
*G01L 1/00* (2006.01)
*G01L 1/26* (2006.01)
(Continued)

(52) U.S. Cl.
CPC ................ *G01L 1/26* (2013.01); *B60N 2/002* (2013.01); *B60R 21/0152* (2014.10);
(Continued)

(58) Field of Classification Search
CPC ...... G01G 19/4142; G01G 19/08; G01G 3/12; G01G 3/1402; G01G 21/28; B60R 21/01516; B60R 21/015; B60R 21/0152; B60R 21/01512; B60N 2/002; B60N 2/0732; G01L 1/2206; G01L 1/2287

USPC ............. 177/136, 211; 73/862.381, 862.474, 73/862.391, 862.621, 862.627, 862.041, 73/862.451, 862, 629, 862.045, 862.471, 73/849; 180/273

See application file for complete search history.

(56) References Cited

U.S. PATENT DOCUMENTS 7,155,981 B2 * 1/2007 Matsuura .............. G01L 1/2206
                                                          73/781
7,487,687 B2 * 2/2009 Sumi ...................... B60N 2/002
                                                          73/862.391

(Continued)

FOREIGN PATENT DOCUMENTS

JP       2009-128106       6/2009

*Primary Examiner* — Jonathan Dunlap
(74) *Attorney, Agent, or Firm* — Oblon, McClelland, Maier & Neustadt, L.L.P.

(57) ABSTRACT

A load detection apparatus includes a strain element including a first fixation hole into which a fixation member is insertable to be positioned, a second fixation hole into which a connection member is insertable to be positioned, a strain gage, and a fixation support member inserted to be positioned within the first fixation hole, the first fixation hole serving as an elongated bore, the fixation support member including a base portion specified to be greater than the first fixation hole, an intermediate shaft portion protruding from the base portion and fitted to the first fixation hole, and an insertion hole into which the fixation member is inserted to be positioned, the insertion hole being provided in a state where a center position of the insertion hole is displaced relative to a center position of the intermediate shaft portion in a longitudinal direction thereof.

4 Claims, 7 Drawing Sheets

(51) Int. Cl.
  B60R 21/015 (2006.01)
  B60N 2/00 (2006.01)
  *G01G 19/414* (2006.01)
  *B60N 2/07* (2006.01)
  *G01G 3/12* (2006.01)
  *G01G 19/08* (2006.01)
  *G01G 3/14* (2006.01)
  *G01L 1/22* (2006.01)
  *G01G 21/28* (2006.01)

(52) U.S. Cl.
  CPC .......... *B60N 2/0732* (2013.01); *B60R 21/015* (2013.01); *B60R 21/01512* (2014.10); *B60R 21/01516* (2014.10); *G01G 3/12* (2013.01); *G01G 3/1402* (2013.01); *G01G 19/08* (2013.01); *G01G 19/4142* (2013.01); *G01G 21/28* (2013.01); *G01L 1/2206* (2013.01); *G01L 1/2287* (2013.01)

(56) References Cited

U.S. PATENT DOCUMENTS

| | | | | |
|---|---|---|---|---|
| 7,490,523 B2* | 2/2009 | Sakamoto | B60N 2/002 | 73/862.391 |
| 7,520,175 B2* | 4/2009 | Matsukawa | G01L 1/2206 | 73/774 |
| 7,559,249 B2* | 7/2009 | Nakano | G01G 19/4142 | 73/781 |
| 7,614,680 B2 | 11/2009 | Endo et al. | | |
| 7,712,374 B2* | 5/2010 | Kawabata | B60N 2/002 | 73/781 |
| 7,823,459 B2* | 11/2010 | Ito | G01G 19/4142 | 73/781 |
| 8,212,157 B2* | 7/2012 | Ito | G01G 19/4142 | 177/136 |
| 8,258,413 B2* | 9/2012 | Ito | G01G 3/1402 | 177/136 |
| 9,021,888 B2* | 5/2015 | Takuma | G01G 19/4142 | 73/855 |
| 2003/0106723 A1* | 6/2003 | Thakur | G01G 19/4142 | 177/144 |
| 2003/0131671 A1* | 7/2003 | Ishida | G01G 19/4142 | 73/862.621 |
| 2004/0003668 A1* | 1/2004 | Ishida | G01G 19/4142 | 73/862.474 |
| 2004/0089068 A1* | 5/2004 | Munz | G01G 19/4142 | 73/321 |
| 2005/0150313 A1* | 7/2005 | Curtis | B60N 2/002 | 73/862.474 |
| 2008/0098822 A1* | 5/2008 | Sakamoto | B60N 2/002 | 73/781 |
| 2008/0098823 A1* | 5/2008 | Sumi | B60N 2/002 | 73/781 |
| 2008/0127752 A1* | 6/2008 | Nakano | B60N 2/002 | 73/862.627 |
| 2008/0134797 A1* | 6/2008 | Nakano | G01G 19/4142 | 73/781 |
| 2008/0156103 A1* | 7/2008 | Nakano | G01G 19/4142 | 73/781 |
| 2008/0229841 A1* | 9/2008 | Matsukawa | G01L 1/2231 | 73/774 |
| 2009/0126500 A1* | 5/2009 | Ito | G01L 1/2231 | 73/781 |
| 2009/0288888 A1 | 11/2009 | Endo et al. | | |
| 2010/0133017 A1* | 6/2010 | Ito | G01G 19/4142 | 177/136 |
| 2013/0104666 A1* | 5/2013 | Takuma | G01L 1/2206 | 73/855 |

* cited by examiner

F I G. 5 A
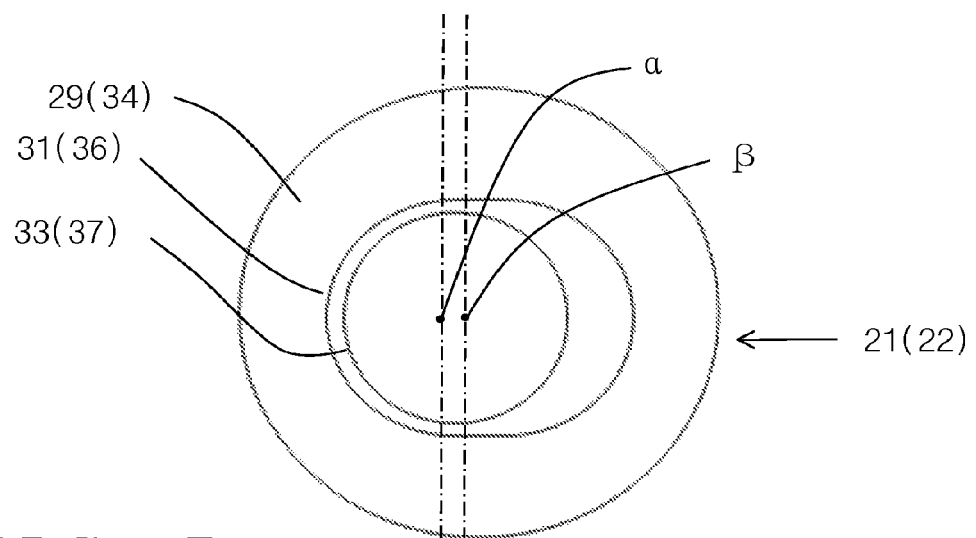
F I G. 5 B
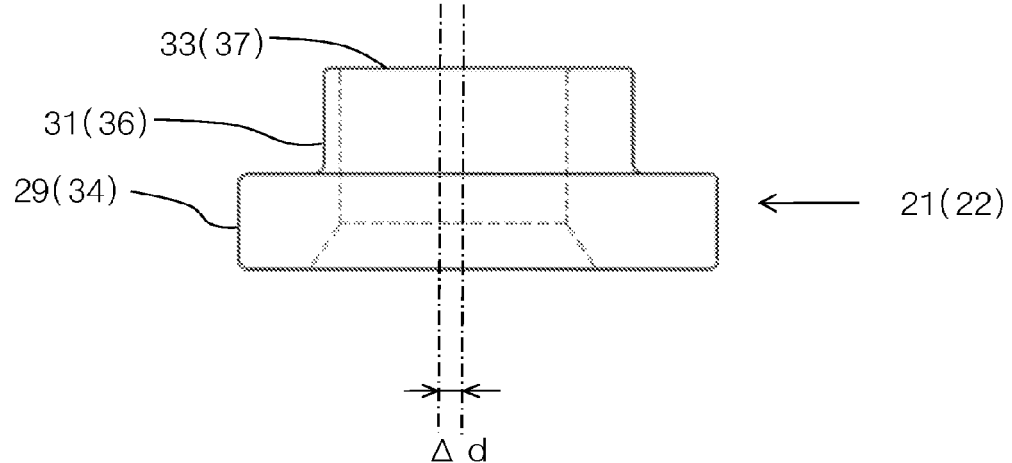

LOAD DETECTION APPARATUS

CROSS REFERENCE TO RELATED APPLICATIONS

This application is based on and claims priority under 35 U.S.C. §119 to Japanese Patent Application 2015-089596, filed on Apr. 24, 2015, the entire content of which is incorporated herein by reference.

TECHNICAL FIELD

This disclosure generally relates to a load detection apparatus detecting a weight of an occupant seated in a seat for a vehicle.

BACKGROUND DISCUSSION

In order to improve performance of various safety apparatuses such as a seat belt and an air bag, for example, mounted at a vehicle, operations of such safety apparatuses may be controlled on a basis of a weight of an occupant seated in a seat. JP2009-128106A, which is hereinafter referred to as Patent document 1, discloses a strain sensor known as a load detection apparatus detecting a weight of an occupant seated in a seat for a vehicle. The strain sensor disclosed in Patent document 1 includes a strain element, two fixation support members holding the strain element by fitting in two fixation holes provided at the strain element, and a bracket member including connection holes which secure the fixation support members. One of the two connection holes of the bracket serves as an elongated bore elongated in a direction where the connection holes are disposed side by side.

According to the aforementioned construction, a variation in manufacturing dimensions of the two connection holes of the bracket member is compensated by the configuration of one of the connection holes, i.e., the elongated bore. Thus, without a highly accurate manufacturing of the bracket member, the bracket member may conform to an attachment dimension between a pair of fixation shafts to which the fixation support members are inserted to be positioned. As a result, the bracket member with a high manufacturing accuracy is not required, which may lead to the load detection apparatus at a reduced cost.

According to the strain sensor disclosed in Patent document 1, fixation holes provided at opposed end portions of the strain element are fitted to the fixation shafts of a floor fixation member. Thus, an attachment position of the strain sensor needs to conform to a distance between the fixation shafts. At this time, because the distance between the fixation shafts differ and vary depending on a seat configuration, the strain element, for example, needs to be newly provided each time the distance between the fixation shafts is changed. The strain element is a member which most influences a sensor output accuracy. Thus, a usage of a highly accurate manufacturing process of the strain element may lead to a manufacturing cost thereof greater than other components. In order to avoid a cost for newly providing the strain element each time the distance between the fixation shafts is changed, it may be considered to decrease the accuracy of the manufacturing process of the strain element. Nevertheless, the sensor output accuracy is affected so that the sensor accuracy may decrease.

A need thus exists for a load detection apparatus which is not susceptible to the drawback mentioned above.

SUMMARY

According to an aspect of this disclosure, a load detection apparatus arranged between a first fixation member which is provided at a floor side for fixing a seat for a vehicle at a floor and a second fixation member which is provided at a seat side, the load detection apparatus for detecting a load of an occupant seated in the seat for the vehicle, includes a strain element including a first fixation hole into which a fixation member fixed to one of the first fixation member and the second fixation member is insertable to be positioned within the first fixation hole, the strain element including a second fixation hole into which a connection member fixed to the other of the first fixation member and the second fixation member is insertable to be positioned within the second fixation hole, a strain gage being arranged between the first fixation hole and the second fixation hole, and a fixation support member inserted to be positioned within the first fixation hole and disposed between the first fixation hole and the one of the first fixation member and the second fixation member, the first fixation hole serving as an elongated bore which extends towards the second fixation hole, the fixation support member including a base portion specified to be greater than the first fixation hole, an intermediate shaft portion protruding from the base portion and fitted to the first fixation hole, and an insertion hole into which the fixation member is inserted to be positioned, the insertion hole being provided in a state where a center position of the insertion hole is displaced relative to a center position of the intermediate shaft portion in a longitudinal direction thereof, the longitudinal direction being orthogonal to an insertion direction of the intermediate portion to the first fixation hole.

BRIEF DESCRIPTION OF THE DRAWINGS

The foregoing and additional features and characteristics of this disclosure will become more apparent from the following detailed description considered with the reference to the accompanying drawings, wherein:

FIGS. 5A and 5B are a plan view and a front view of the strain element according to the embodiment;

DETAILED DESCRIPTION

Figure 1:
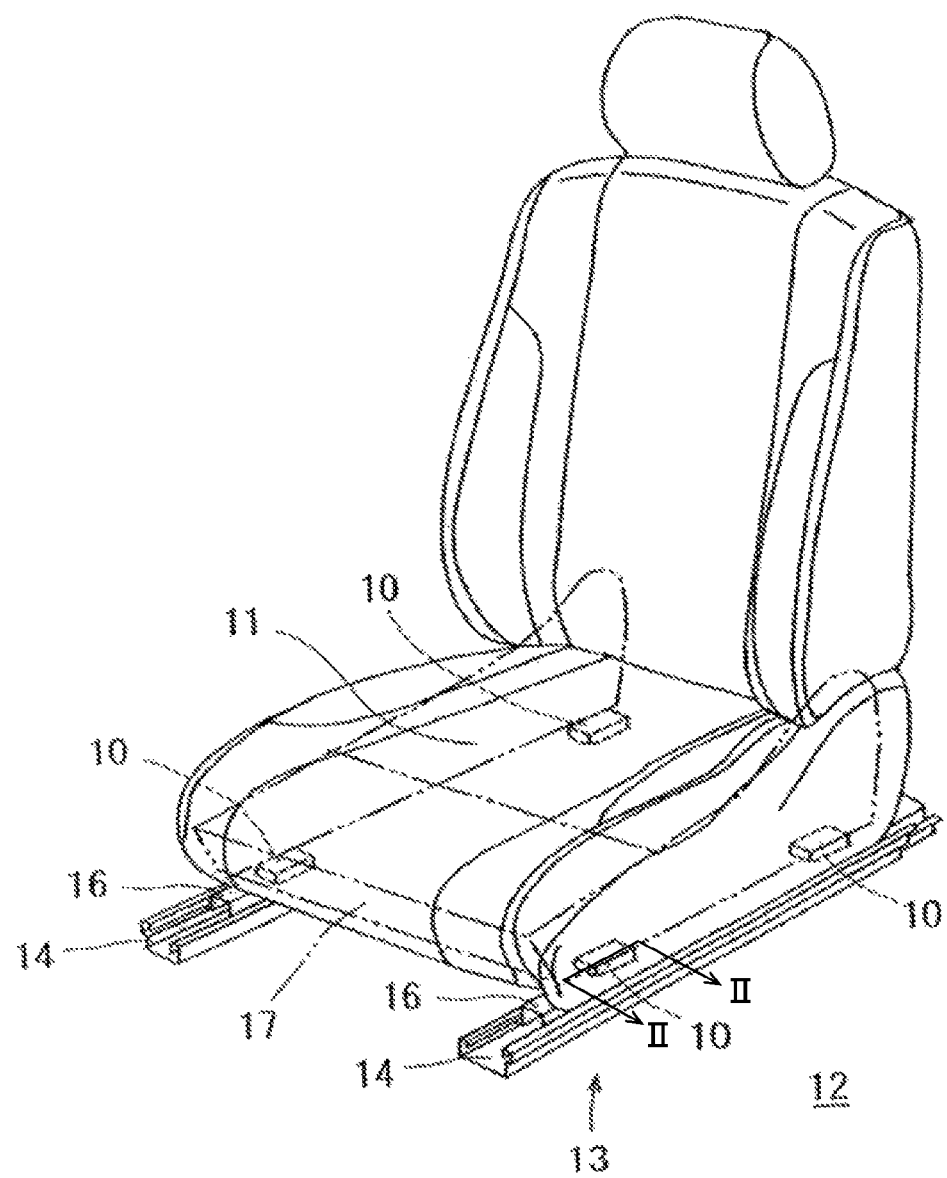
FIG. 1 is a perspective view of a seat equipped with a load detection apparatus of a seat for a vehicle according to an embodiment disclosed here.
Figure 2:
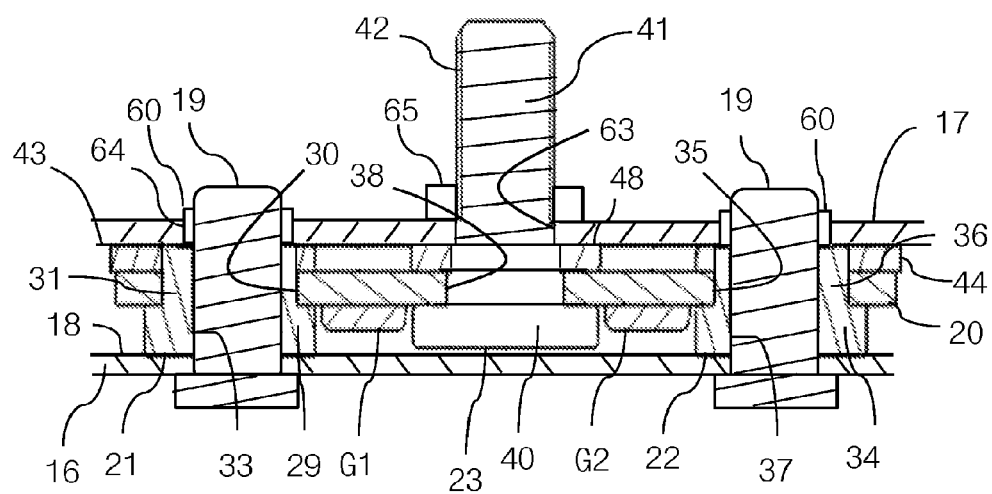
FIG. 2 is a cross-sectional view taken along a line II-II in FIG. 1.

An embodiment is explained with reference to the attached drawings. As illustrated in FIG. 1, load detection apparatuses 10 of a seat 11 for a vehicle are configured to measure a load of an occupant seated in the seat 11. The load detection apparatuses 10 are disposed between the seat 11 and a seat slide apparatus 13 that secures the seat 11 at a floor 12 of the vehicle in a manner that a position of the seat 11 is adjustable relative to the floor 12. In the embodiment, four load detection apparatuses 10 are arranged between the seat 11 and the seat slide apparatus 13. The seat slide apparatus 13 includes a pair of lower rails 14 fixed to the floor 12 and extending in a front-rear direction of the vehicle and a pair of upper rails 16 movably and slidably supported at the pair of lower rails 14. The load detection apparatuses 10 are arranged at respective front portions and rear portions of the pair of upper rails 16. In addition, as illustrated in FIG. 2, a lower portion of the seat 11 is constituted by a seat frame 17 assembled on a lower surface of a seat cushion. The seat frame 17 serves as a second fixation member corresponding to a seat fixation member. Fixation shafts 19 each of which serves as a fixation member fixing the load detection apparatuses 10 are provided at the upper rails 16. Each of the upper rails 16 serves as a first fixation member corresponding to a floor fixation member. The load detection apparatuses 10 are fixed to the fixation shafts 19 and disposed between the seat frame 17 and the upper rails 16.

Figure 3:
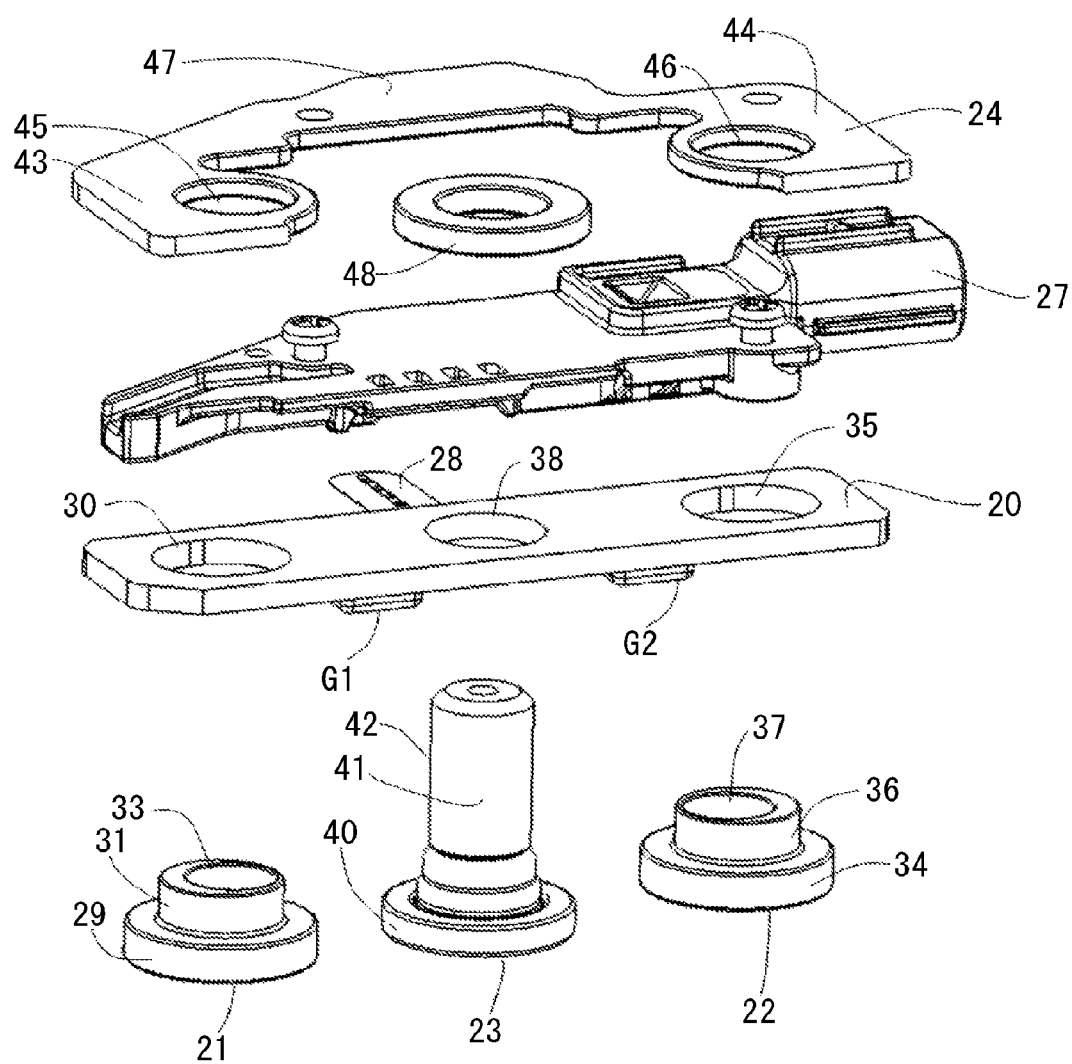
FIG. 3 is an exploded perspective view of the load detection apparatus according to the embodiment.

As illustrated in FIG. 3, each of the load detection apparatuses 10 includes a strain element 20, a pair of lower bushes 21, 22 each of which serves as a fixation support member, a connection shaft 23, a pair of strain gages G1, G2, a bracket member 24, an amplifier case 27 and a flexible printed circuit (FPC) board 28.

The strain element 20 is formed in a rectangular form including a predetermined thickness. The strain element 20 includes fixation holes 30 and 35 each of which serves as a first fixation hole at opposed end portions in a longitudinal direction of the strain element 20. The lower bushes 21 and 22 are insertable to the fixation holes 30 and 35 respectively. The strain element 20 also includes a center hole 38 serving as a second fixation hole at a substantially center portion of the strain element 20 in the longitudinal direction thereof. The connection shaft 23 is insetable to the center hole 38. Each of the fixation holes 30 and 35 is elongated to serve as an elongated bore where an opening portion extends towards the center hole 38. The fixation holes 30 and 35 are arranged at positions symmetrical to each other relative to the center hole 38.

The connection shaft 23 includes a flange portion 40 and a shaft portion 41 which is inserted to be positioned within the center hole 38. The shaft portion 41 of the connection shaft 23 includes a threaded portion 42 at which a tightening nut 65 (see FIG. 2) is screwed. The tightening nut 65 fixes the seat frame 17 and the connection shaft 23 to each other.

The strain gages G1 and G2 are attached to a lower surface of the strain element 20 in a state where the strain gage G1 is positioned between the fixation hole 30 and the center hole 38 of the strain element 20 and the strain gage G2 is positioned between the fixation hole 35 and the center hole 38 of the strain element 20. Specifically, the strain gages G1 and G2 are attached to respective positions symmetrical to each other relative to the center hole 38.

The lower bush 21 includes a base portion 29 with a predetermined thickness and an intermediate shaft portion 31 protruding from the base portion 29. In the same manner, the lower bush 22 includes a base portion 34 with the predetermined thickness and an intermediate shaft portion 36 protruding from the base portion 34. In the embodiment, as illustrated in FIG. 5A, a center of each of the base portions 29 and 34 is configured to match a center position β of each of the intermediate shaft portions 31 and 36 in a longitudinal direction thereof. Each of the base portions 29 and 34 is formed in a column with the center portion β. The intermediate shaft portions 31 and 36 include configurations conforming to the fixation holes 30 and 35 of the strain element 20 so that the intermediate shaft portions 31 and 36 are fittable to the fixation holes 30 and 35 respectively. In addition, insertion holes 33 and 37 are provided at the lower bushes 21 and 22 respectively. The fixation shafts 19 provided at the upper rail 16 are configured to penetrate through and positioned within the insertion holes 33 and 37 respectively. Each of the insertion holes 33 and 37 is in a perfect circular form. The insertion hole 33 penetrates through the intermediate shaft portion 31 and the base portion 29. In the same manner, the insertion hole 37 penetrates through the intermediate shaft portion 36 and the base portion 34. Further, as illustrated in FIG. 5A, a center position α of each of the insertion holes 33 and 37 is positioned to be displaced by a predetermined interval Δd relative to the center position β of each of the intermediate shaft portions 31 and 36 (i.e., the center position of each of the base portions 29 and 34) in the longitudinal direction thereof. The predetermined interval Δd is determined on a basis of a distance between the fixation shafts 19.

As illustrated in FIG. 3, the bracket member 24, which is formed in a plate form, includes end portions 43, 44 and an attachment portion 47 connecting between the end portions 43 and 44. Attachment holes 45 and 46 are provided at the end portions 43 and 44 respectively so that the fixation shafts 19 are insertable to be positioned within the attachment holes 45 and 46 respectively. Each of the attachment holes 45 and 46 serves as the elongated hole same as each of the fixation holes 30 and 35 of the strain element 20.

The amplifier case 27 is made of a resin material. The amplifier case 27 incorporates an amplifier board for amplifying a signal from each of the strain gages G1 and G2. The amplifier case 27 extends laterally relative to the strain element 20 in a state being connected to the attachment portion of the bracket member 24. The amplifier case 27 is provided so as not to overlap the strain element 20. The FPC board 28 is electrically connected to the strain gages G1, G2 and the amplifier board.

Figure 4:
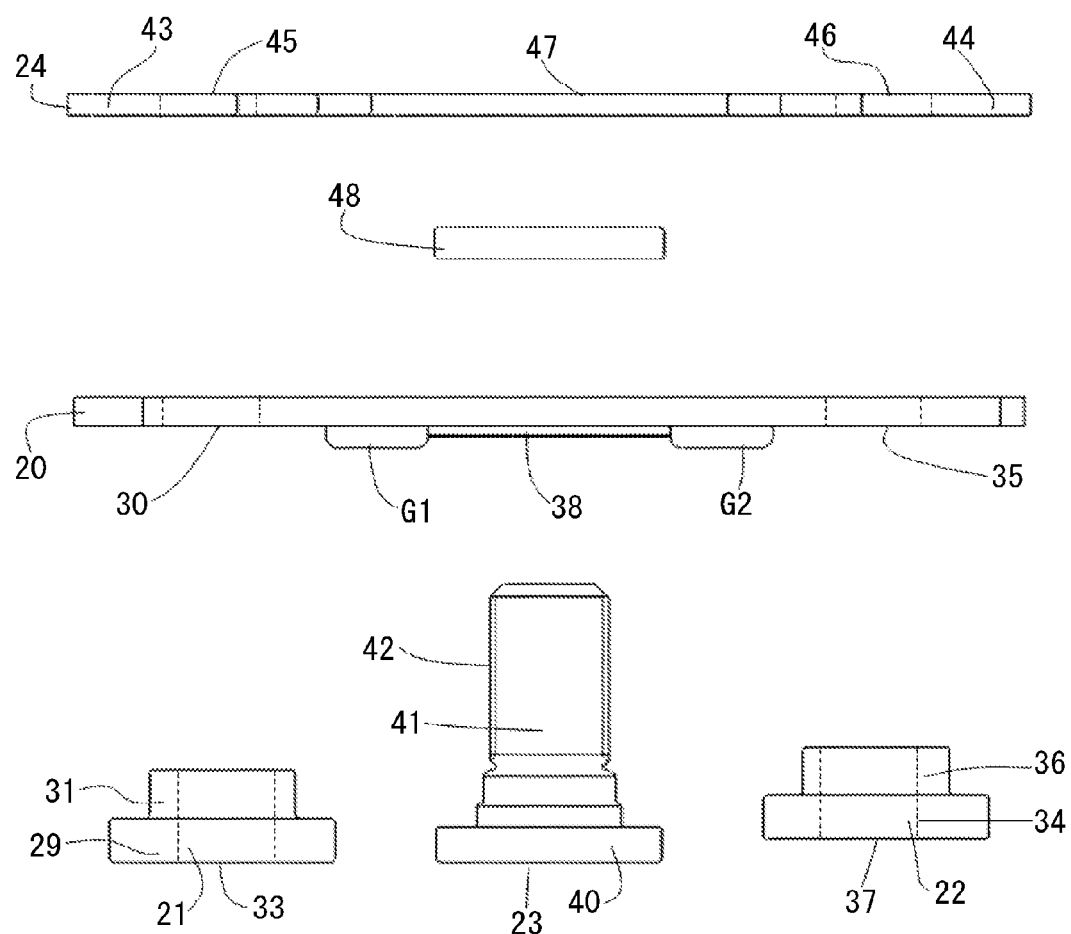
FIG. 4 is a front view of the load detection apparatus illustrating an assembly of a strain element according to the embodiment.

Next, an assembly construction of the load detection apparatus 10 as a unit is explained. As illustrated in FIG. 4, the intermediate shaft portion 31 of the lower bush 21 is inserted to be positioned within the fixation hole 30 of the strain element 20 and the attachment hole 45 of the bracket member 24 so that the lower bush 21 is secured. In the same manner, the intermediate shaft portion 36 of the lower bush 22 is inserted to be positioned within the fixation hole 35 of the strain element 20 and the attachment hole 46 of the bracket member 24 so that the lower bush 22 is secured. Specifically, the intermediate shaft portion 31 is inserted to the fixation hole 30 to a position at which the base portion 29 of the lower bush 21 makes contact with the strain element 20. In the same manner, the intermediate shaft portion 36 is inserted to the fixation hole 35 to a position at which the base portion 34 of the lower bush 22 makes contact with the strain element 20. In addition, as illustrated in FIG. 2, the threaded portion 42 of the connection shaft 23 serving as the connection member is inserted to be positioned within the center hole 38 of the strain element 20, a ring member 48 and a connection shaft hole 63 provided at the seat frame 17, and the nut 65 is screwed at an end portion of the threaded portion 42 so that the connection shaft 23 is fixed to the seat frame 17. Accordingly, the flange portion 40 of the connection shaft 23 is inserted to a position making contact with the strain element 20. The strain element 20 is therefore fixed in a state where the opposed end portions thereof are sandwiched and disposed between the bracket member 24 and the lower bushes 21, 22. According to the aforementioned construction, the lower bushes 21, 22, the connection shaft 23, the strain element 20, the pair of strain gages G1, G2, the ring member 48, the bracket member 24, the amplifier case 27 and the FPC board 28 are provided as one unit.

Next, an assembly construction of each of the load detection apparatuses 10 relative to a vehicle is explained. As illustrated in FIG. 2, an attachment surface 18 is provided at an upper surface of the upper rail 16 serving as the first fixation member. The pair of fixation shafts 19 which fixes the load detection apparatus 10 is arranged at the attachment surface 18 at which the load detection apparatus 10 is fixed. The fixation shafts 19 are disposed to be spaced away by a predetermined distance in the front-rear direction of the vehicle. The connection shaft hole 63 to which the threaded portion 42 of the connection shaft 23 is inserted to be positioned and fixation shaft holes 64 to which the respective fixation shafts 19 are inserted to be positioned are provided at the seat frame 17. The threaded portion 42 of the connection shaft 23 is inserted to be positioned within the connection shaft hole 63 and the fixation shafts 19 are inserted to be positioned within the respective fixation shaft holes 64. At this time, the seat frame 17 is fixed in a state making contact with the bracket member 24. According to the aforementioned construction, the load detection apparatus 10 is fixed between the seat frame 17 and the upper rail 16.

Figure 6:
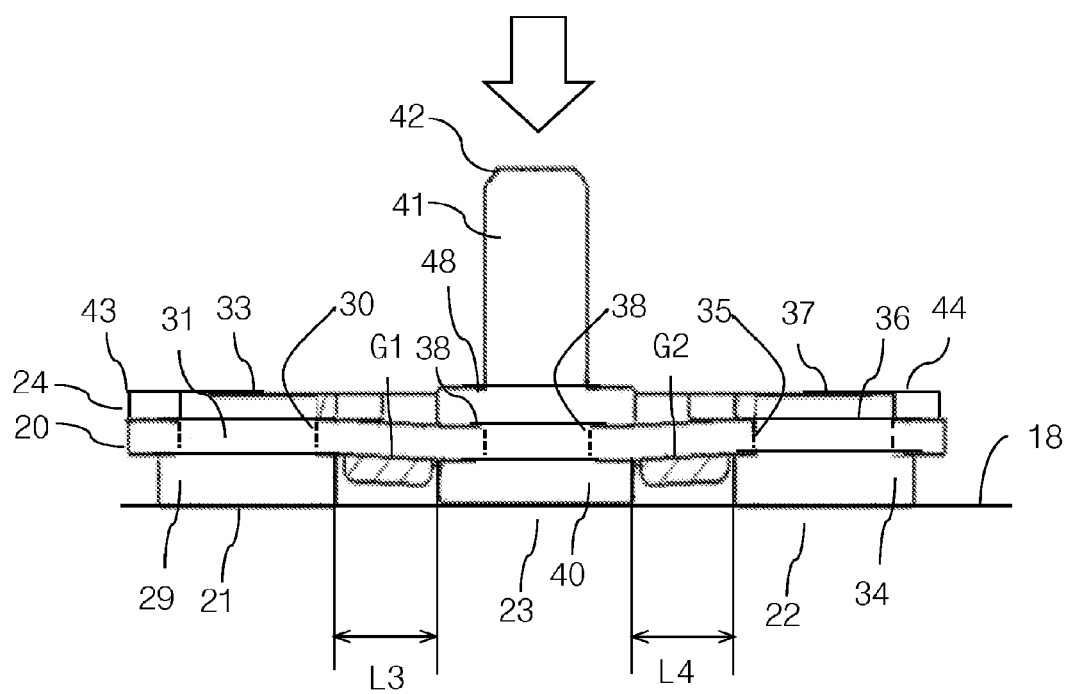
FIG. 6 is a front view schematically illustrating a deformation state of the strain element of the load detection apparatus according to the embodiment.
Figure 7A:
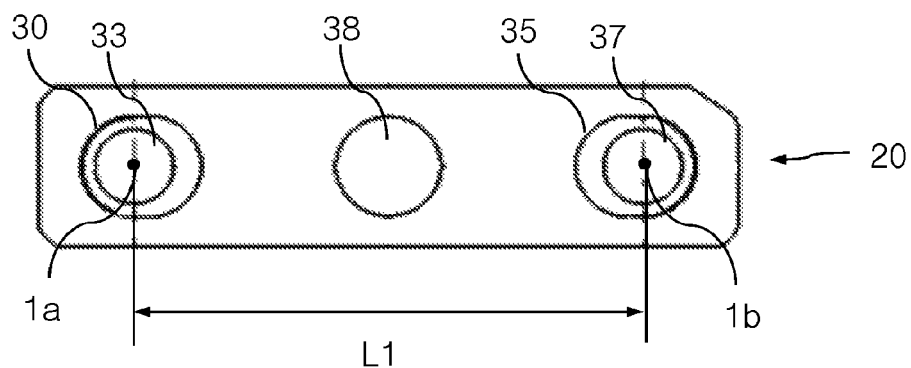
FIGS. 7A and 7B are front views each of which schematically illustrates a construction of a lower bush according to the embodiment.
Figure 7B:
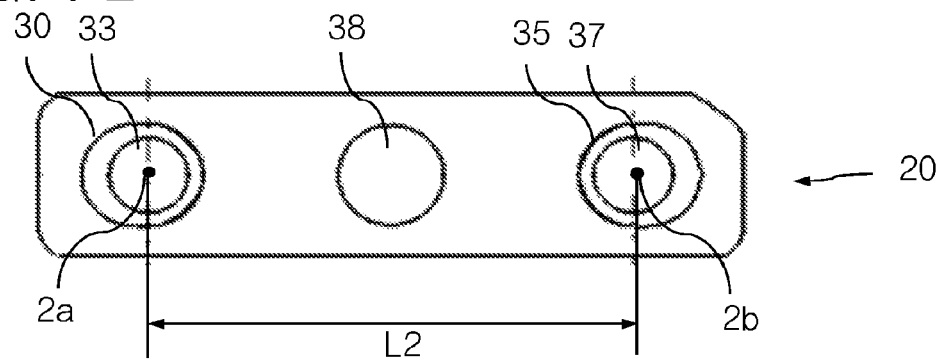

Next, a load detection method by the load detection apparatus 10 assembled in the aforementioned manner is explained. As illustrated in FIG. 6, in a case where a load is applied to the seat 11, the load is added to the strain element 20 from the seat frame 17 via the connection shaft 23. The opposed end portions of the strain element 20 are deflected downward while being supported by the base portions 29 and 34 of the lower bushes 21 and 22. At this time, a compression strain is generated at a side closer to each of the lower bushes 21 and 22 while a tensile strain is generated at a side closer to the connection shaft 23 in proportional to the applied load at a surface of the strain element 20 between the connection shaft 23 and each of the lower bushes 21 and 22. Thus, the compression strain and the tensile strain generated by the application of the load are detected by the strain gages G1 and G2 which are attached to the strain element 20. The load applied to the seat 11 is thus measured on a basis of the aforementioned compression strain and the tensile strain. According to the load detection apparatus constructed in the aforementioned manner, the lower bushes 21 and 22 are mountable at the strain element 20 in two different modes where positions of each of the lower bushes 21 and 22 are different from each other by 180 degrees rotation. For example, as illustrated in FIG. 7A, in a first mode where the lower bushes 21 and 22 are fitted to the fixation holes 30 and 35 of the strain element 20 in a state where center positions 1$a$ and 1$b$ of the insertion holes 33 and 37 are away from the center hole 38, a distance between the center positions 1$a$ and 1$b$ of the insertion holes 33 and 37 is specified to be a distance L1. On the other hand, as illustrated in FIG. 7B, in a second mode where the lower bushes 21 and 22 are fitted to the fixation holes 30 and 35 of the strain element 20 in a state where center positions 2$a$ and 2$b$ of the insertion holes 33 and 37 are closer to the center hole 38, a distance between the center positions 2$a$ and 2$b$ of the insertion holes 33 and 37 is specified to be a distance L2. In comparing the aforementioned first and second modes, the distance L1 is greater than the distance L2. A difference between the distance L1 and the distance L2 is four times as large as the aforementioned predetermined interval Δd. Accordingly, the mode where the lower bushes 21 and 22 are fitted in the fixation holes 30 and 35 is appropriately changed so that the load detection apparatus 10 is applicable in either case where the distance between the fixation shafts 19 inserted to be positioned within the insertion holes 33 and 37 is the distance L1 or the distance L2.

Accordingly, following effects are obtainable by the load detection apparatus 10 including the aforementioned construction. Each of the fixation holes 30 and 35 of the strain element 20 serves as the elongated bore extending towards the center hole 38. In addition, each of the intermediate shaft portions 31 and 36 of the lower bushes 21 and 22 includes the configuration so as to fit to each of the fixation holes 30 and 35. Thus, the lower bushes 21 and 22 are mountable to the strain element 20 in the two different modes where the positions of each of the lower bushes 21 and 22 are different from each other by 180 degrees rotation. The center position α of each of the insertion holes 33 and 37 of the lower bushes 21 and 22 is positioned to be displaced relative to the center position β of each of the intermediate shaft portions 31 and 36 in the longitudinal direction thereof. Thus, the direction in which each of the lower bushes 21 and 22 is mounted relative to each of the fixation holes 30 and 35 is appropriately changed so that the strain element 20 is inhibited from being newly prepared or provided, i.e., the single strain element 20 may be provided, for plural different distances (i.e., the distance L1 and the distance L2) between the fixation shafts 19. Further, the same strain element 20 and the same lower bushes 21 and 22 are usable for the plural different distances (the distance L1 and the distance L2) between the fixation shafts 19. Thus, the strain element 20 and the lower bush 21, 22 are not necessarily newly provided, which restrains a decrease of a sensor output accuracy caused by an error in manufacturing accuracy.

In addition, each of the insertion holes 33 and 37 of the lower bushes 21 and 22 includes the perfect circular form. Thus, a position displacement of each of the fixation shafts 19 relative to each of the insertion holes 33 and 37 is restrained, which may lead to highly accurate assembly of the load detection apparatus 10 on the seat slide apparatus 13.

Further, each of the fixation holes 30 and 35 of the strain element 20 and each of the intermediate shaft portions 31 and 36 of the lower bushes 21 and 22 include configurations conforming to each other so as to be fitted to each other. Thus, in a case where the strain element 20 is deformed by an application of a load, a position displacement between the strain element 20 and each of the lower bushes 21 and 22 is restrained from occurring. As a result, a decrease of load detection accuracy caused by such position displacement is restrained.

Furthermore, each of the base portions 29 and 34 of the lower bushes 21 and 22 is provided so as to be symmetrical relative to the center position β of each of the intermediate shaft portions 31 and 36 in the longitudinal direction thereof. Thus, in a case where a load is applied from an upper side of the connection shaft 23 as illustrated in FIG. 6, the strain element 20 is deflected with reference to the base portions 29 and 34 of the lower bushes 21 and 22. Because each of the base portions 29 and 34 is symmetrical about the center position β of each of the intermediate shaft portions 31 and 36 in the longitudinal direction thereof, a distance between an end portion of the base portion 29 at a side facing the connection shaft 23 and each of the flange portion 40 of the connection shaft 23 and the ring member 48 (i.e., a distance L3 in FIG. 6) and a distance between an end portion of the base portion 34 at a side facing the connection shaft 23 and each of the flange portion 40 of the connection shaft 23 and the ring member 48 (i.e., a distance L4 in FIG. 6) are equal to each other even in a case where the direction in which each of the lower bushes 21 and 22 is mounted to each of the fixation holes 30 and 35 is changed. Thus, a strain may be generated evenly at the strain gages G1 and G2 attached to the strain element 20 so that the load is highly accurately detectable.

MODIFIED EXAMPLES

In the aforementioned embodiment, both the fixation holes 30 and 35 each serving as the first fixation hole are provided as the elongated bores. Both the fixation holes 30 and 35, however, are not necessarily provided as the elongated bores. One of the fixation holes 30 and 35 may be only provided as the elongated bore. In this case, one of the lower bushes 21 and 22 may include a configuration conforming to one of the fixation holes 30 and 35 serving as the elongated bore.

In the embodiment, the strain element 20 includes the pair of fixation holes 30 and 35 to which the pair of fixation shafts 19 is insertable to be positioned. The strain element 20, however, does not necessarily include the pair of fixation holes 30 and 35. The strain element 20 may be configured to include the fixation hole 30 and does not include the fixation hole 35. As a result, the load detection apparatus 10 is applicable to the seat slide apparatus 13 where only one fixation shaft 19 is provided at the upper rail 16.

In the embodiment, each of the insertion holes 33 and 37 of the lower bushes 21 and 22 is not necessarily formed in the perfect circular form and may be the elongated hole. Even in such construction, the position of the fixation shaft 19 relative to the insertion hole 33 or 37 is changeable. The lower bushes 21 and 22 may be assembled on the fixation holes 30 and 35 regardless of the assembly direction of the lower bushes 21 and 22 for plural kinds of seat slide apparatuses 13 where respective distances between the fixation shafts 19 are different from one another.

In the embodiment, each of the attachment holes 45 and 46 of the bracket member 24 is not limited to the elongated bore elongated towards the connection shaft 23 in the same manner as each of the insertion holes 33 and 37 of the strain element 20 and may be a perfect circle. In this case, the bracket member 24 is necessary newly provided in a case where the distance between the fixation shafts 19 is changed.

In the embodiment, the strain element 20 is sandwiched and disposed between the bracket member 24 positioned upon the strain element 20 and the lower bushes 21, 22 positioned below the strain element 20. Alternatively, a positional relationship between the bracket member 24 and the lower bushes 21, 22 may be reversed in a vertical direction.

In the embodiment, the strain gages G1 and G2 are attached to the surface of the strain element 20 at a side opposite from a side where nuts 60 and the nut 65 are fastened or tightened. Alternatively, the strain gages G1 and G2 may be attached to the surface of the strain element 20 at a side where the nuts 60 and 65 are fastened or tightened.

In the embodiment, each of the base portions 29 and 34 of the lower bushes 21 and 22 may include the configuration symmetrical about the center position β of each of the intermediate shaft portions 31 and 36. Thus, each of the base portions 29 and 34 may be formed in a circular form, an elongated form elongated in a longitudinal direction of the center hole 38 or an elongated from elongated in a lateral (short-length) direction of the center hole 38.

Figure 8A:
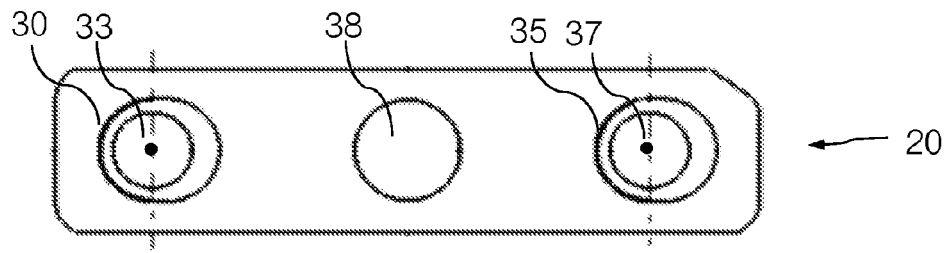
FIGS. 8A and 8B are front views each of which schematically illustrates a construction of the lower bush according to a modified example of the embodiment.
Figure 8B:
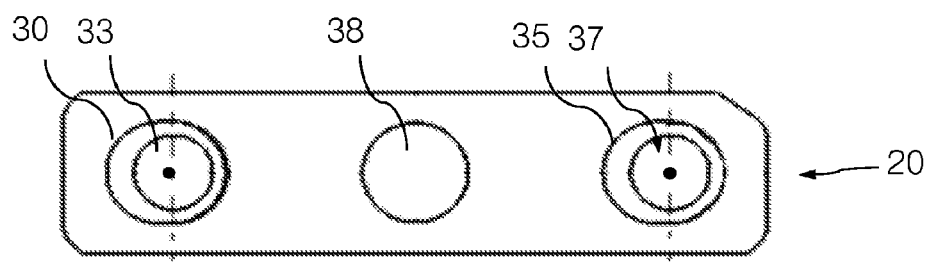

In the embodiment, as illustrated in FIGS. 7A and 7B, positions of the insertion holes 33 and 37 of the lower bushes 21 and 22 are symmetrical to each other about the center hole 38 so that a distance between the center hole 38 and the insertion hole 33 and a distance between the center hole 38 and the insertion hole 37 are equal to each other. Alternatively, as illustrated in FIGS. 8A and 8B, for example, the positions of the insertion holes 33 and 37 of the lower bushes 21 and 22 may be specified so as not to be symmetrical to each other about the center hole 38.

In the aforementioned embodiment, each of the fixation holes 30 and 35 of the strain element 20 serves as the elongated bore extending towards the center hole 38. In addition, each of the intermediate shaft portions 31 and 36 of the lower bushes 21 and 22 includes the configuration so as to fit to each of the fixation holes 30 and 35. Thus, each of the lower bushes 21 and 22 is fittable to each of the fixation holes 30 and 35 in two different directions where positions of each of the lower bushes 21 and 22 are different from each other by 180 degrees rotation. In addition, the center position α of each of the insertion holes 33 and 37 is displaced from the center position β of each of the intermediate shaft portions 31 and 36 in the longitudinal direction thereof. Thus, in plural cases where plural different distances are specified between each of the fixation shafts 19 and the connection shaft 23, plural different distances may be specified between the center hole 38 into which the connection shaft 23 is insetable to be positioned and each of the insertion holes 33 and 37 into which the fixation shaft 19 is insertable to be positioned.

In the embodiment, the base portion 29, 34 includes a configuration symmetrical relative to the center position β of the intermediate shaft portion 31, 36 in the longitudinal direction thereof.

Accordingly, each of the lower bushes 21 and 22 is fittable to each of the fixation holes 30 and 35 in the two different directions. In either direction in which each of the lower bushes 21 and 22 is fitted to each of the fixation holes 30 and 35, the distance from the connection shaft 23 to each of the base portions 29 and 34 is the same (i.e., the distance is the same regardless of the direction where the lower bush 21, 22 is fitted to the fixation hole 30, 35).

In the embodiment, the fixation hole 30, 35 and the strain gage G1, G2 are provided as a pair at each of positions symmetrical to each other relative to the center hole 38.

Accordingly, the fixation hole 30 and the strain gage G1 are provided at one side of the center hole 38 while the fixation hole 35 and the strain gage G2 are provided at the other side of the center hole 38. Intervals or distances between the fixation hole 30 and the strain gage G1 and between the strain gage G1 and the center hole 38 at one side of the center hole 38 are specified to be equal to intervals or distances between the fixation hole 35 and the strain gage G2 and between the strain gage G2 and the center hole 38 at the other side of the center hole 38.

In the embodiment, the insertion hole 33, 37 includes a perfect circular form.

According to the embodiment, the strain element 20 is inhibited from being newly prepared or provided, i.e., the single strain element 20 may be provided, for the plural different distances (i.e., the distance L1 and the distance L2) between the connection shaft 23 and each of the fixation shafts 19. Further, the same strain element 20 and the same lower bushes 21 and 22 are usable for the plural different distances (the distance L1 and the distance L2) between the fixation shafts 19. Thus, the decrease of the sensor output accuracy may be restrained.

In addition, regardless of the direction where each of the lower bushes 21 and 22 is mounted to each of the fixation holes 30 and 35, the strain may be evenly generated at each of the strain gages G1 and G2 provided at the strain element 20. Without the decrease of the sensor output accuracy, an occupant load is detectable.

Further, the fixation hole 30 and the strain gage G1 as a pair and the fixation hole 35 and the strain gage G2 as a pair are disposed at the positions symmetrical to each other relative to the center hole 38. Thus, the strain may be evenly generated at each of the strain gages G1 and G2 provided at the strain element 20. Without the decrease of the sensor output accuracy, the occupant load is detectable.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load detection apparatus arranged between a first fixation member which is provided at a floor side for fixing a seat for a vehicle at a floor and a second fixation member which is provided at a seat side, the load detection apparatus for detecting a load of an occupant seated in the seat for the vehicle, comprising:

a strain element including a first fixation hole into which a fixation shaft fixed to one of the first fixation member and the second fixation member is insertable to be positioned within the first fixation hole, the strain element including a second fixation hole into which a connection member fixed to the other of the first fixation member and the second fixation member is insertable to be positioned within the second fixation hole, a strain gage being arranged between the first fixation hole and the second fixation hole; and a fixation support member inserted to be positioned within the first fixation hole and disposed between the first fixation hole and the one of the first fixation member and the second fixation member;

the first fixation hole serving as an elongated bore which extends towards the second fixation hole, the fixation support member including a base portion specified to be greater than the first fixation hole, an intermediate shaft portion protruding from the base portion and fitted to the first fixation hole, and an insertion hole into which the fixation shaft is inserted to be positioned, the insertion hole being provided in a state where a center position of the insertion hole is displaced relative to a center position of the intermediate shaft portion in a longitudinal direction thereof, the longitudinal direction being orthogonal to an insertion direction of the intermediate portion to the first fixation hole.

2. The load detection apparatus according to claim 1, wherein the base portion includes a configuration symmetrical relative to the center position of the intermediate shaft portion in the longitudinal direction thereof.

3. The load detection apparatus according to claim 1, wherein the first fixation hole and the strain gage are provided as a pair at each of positions symmetrical to each other relative to the second fixation hole.

4. The load detection apparatus according to claim 1, wherein the insertion hole includes a perfect circular form.

* * * * *